US012573420B2

(12) United States Patent
Kikitsu et al.

(10) Patent No.: US 12,573,420 B2
(45) Date of Patent: Mar. 10, 2026

(54) MAGNETIC HEAD AND MAGNETIC RECORDING DEVICE

(71) Applicant: Kabushiki Kaisha Toshiba, Tokyo (JP)

(72) Inventors: Akira Kikitsu, Yokohama Kanagawa (JP); Yoshihiro Higashi, Komatsu Ishikawa (JP); Satoshi Shirotori, Yokohama Kanagawa (JP); Tazumi Nagasawa, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 18/671,858

(22) Filed: May 22, 2024

(65) Prior Publication Data

US 2025/0174247 A1      May 29, 2025

(30) Foreign Application Priority Data

Nov. 29, 2023      (JP) .................................. 2023-202021

(51) Int. Cl.
G11B 5/10 (2006.01)

(52) U.S. Cl.
CPC ...................................... G11B 5/10 (2013.01)

(58) Field of Classification Search
CPC ....................................................... G11B 5/39
See application file for complete search history.

(56) References Cited

U.S. PATENT DOCUMENTS

| | | | |
|---|---|---|---|
| 7,576,948 B2 | 8/2009 | Covington et al. | |
| 10,354,681 B1 * | 7/2019 | Chien | G11B 5/3912 |
| 10,839,844 B1 * | 11/2020 | Asif Bashir | G11B 5/1278 |
| 11,222,656 B1 * | 1/2022 | Le | G11B 5/372 |
| 2003/0174446 A1 * | 9/2003 | Hasegawa | G01R 33/093 |
| 2004/0156148 A1 * | 8/2004 | Chang | G11B 5/3929 |
| 2010/0309581 A1 * | 12/2010 | Wu | G11B 5/6064 |

* cited by examiner

*Primary Examiner* — Steven Lim
*Assistant Examiner* — Michelle J. Kim
(74) *Attorney, Agent, or Firm* — Knobbe, Martens, Olson & Bear, LLP

(57) ABSTRACT

According to one embodiment, a magnetic head includes a reproducing section. The reproducing section includes a first shield, a second shield, a third shield, a fourth shield, a first magnetic member, a first terminal, a second terminal, a third terminal, a fourth terminal, and a third shield conductive member. A direction from the first shield to the second shield is along a first direction. A second direction from the third shield to the fourth shield crosses the first direction. The first magnetic member is provided between the first shield and the second shield and between the third shield and the fourth shield. The first to fourth terminals are electrically connected to the first to fourth shields, respectively. The third shield conductive member is connected to the third shield and includes at least one selected from the group consisting of Cu, Al, Au, and Ag.

19 Claims, 9 Drawing Sheets

FIG. 1A
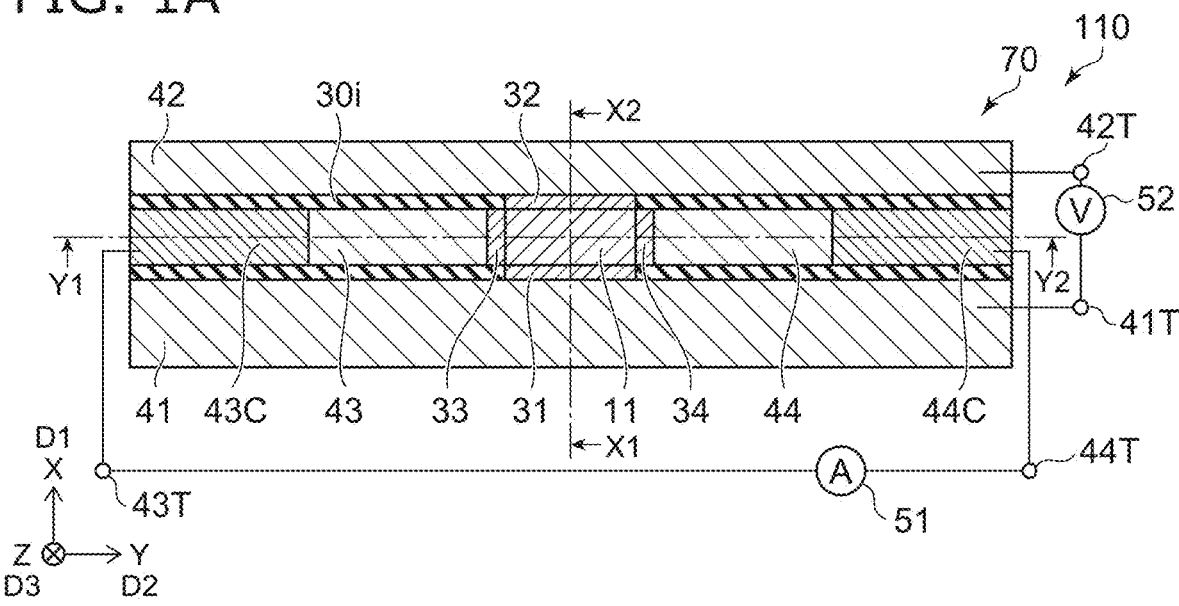
FIG. 1B
FIG. 1C
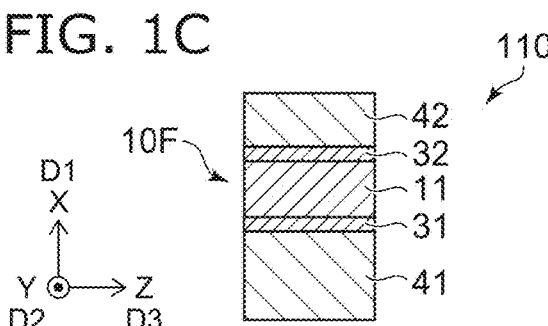

MAGNETIC HEAD AND MAGNETIC RECORDING DEVICE

CROSS-REFERENCE TO RELATED APPLICATIONS

This application is based upon and claims the benefit of priority from Japanese Patent Application No. 2023-202021, filed on Nov. 29, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head that includes a magnetic sensor. Stable characteristics are desired in magnetic heads.

BRIEF DESCRIPTION OF THE DRAWINGS

FIGS. 1A to 1C are schematic cross-sectional views illustrating a magnetic head according to a first embodiment;

DETAILED DESCRIPTION

Figure 2:
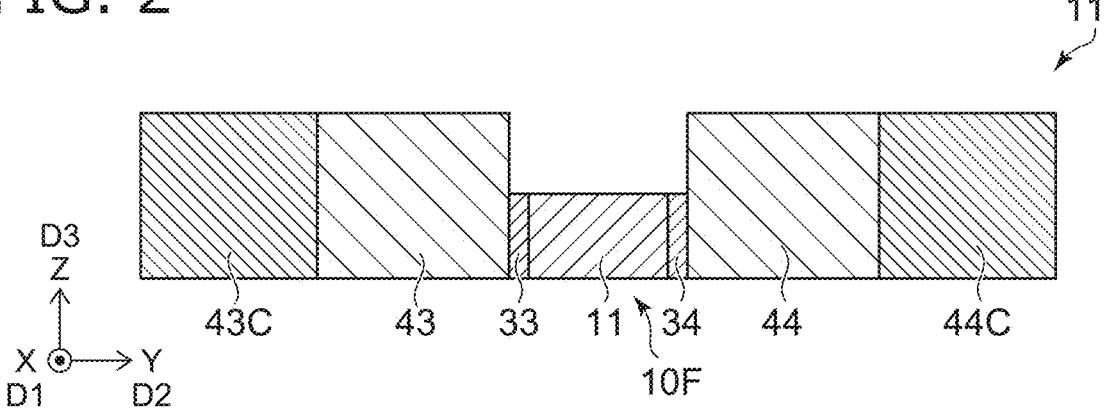
FIG. 2 is a schematic cross-sectional view illustrating a magnetic head according to the first embodiment.

According to one embodiment, a magnetic head includes a reproducing section. The reproducing section includes a first shield, a second shield, a third shield, a fourth shield, a first magnetic member, a first terminal, a second terminal, a third terminal, a fourth terminal, and a third shield conductive member. A direction from the first shield to the second shield is along a first direction. A second direction from the third shield to the fourth shield crosses the first direction. The first magnetic member is provided between the first shield and the second shield and between the third shield and the fourth shield. The first terminal is electrically connected to the first shield. The second terminal is electrically connected to the second shield. The third terminal is electrically connected to the third shield. The fourth terminal is electrically connected to the fourth shield. The third shield conductive member is connected to the third shield and includes at least one selected from the group consisting of Cu, Al, Au, and Ag.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIGS. 1A to 1C are schematic cross-sectional views illustrating a magnetic head according to a first embodiment.

FIG. 1B is a cross-sectional view taken along the line Y1-Y2 in FIG. 1A. FIG. 1C is a sectional view taken along the line X1-X2 in FIG. 1A.

As shown in these figures, a magnetic head 110 according to the embodiment includes a reproducing section 70.

The reproducing section 70 includes a first shield 41, a second shield 42, a third shield 43, a fourth shield 44, a first terminal 41T, a second terminal 42T, a third terminal 43T, a fourth terminal 44T, and a third shield conductive member 43C. In this example, the reproducing section 70 further includes a fourth shield conductive member 44C.

A direction from the first shield 41 to the second shield 42 is along a first direction D1. The first direction D1 is defined as an X-axis direction. One direction perpendicular to the X-axis direction is defined as a Y-axis direction. A direction perpendicular to the X-axis direction and the Y-axis direction is defined as a Z-axis direction. The X-axis direction is, for example, a down-track direction. The Y-axis direction is, for example, a cross-track direction. The Z-axis direction is, for example, a height direction.

A second direction D2 from the third shield 43 to the fourth shield 44 crosses the first direction D1. The second direction D2 may be, for example, the Y-axis direction.

In this example, the third shield 43 and the fourth shield 44 are provided between the first shield 41 and the second shield 42 in the first direction D1. The third shield 43 and the fourth shield 44 are, for example, side shields.

The first magnetic member 11 is provided between the first shield 41 and the second shield 42 in the first direction D1, and between the third shield 43 and the fourth shield 44 in the second direction D2. A position of the first magnetic member 11 in the first direction D1 is between a position of the first shield 41 in the first direction D1 and a position of the second shield 42 in the first direction D1. A position of the first magnetic member 11 in the second direction D2 is between a position of the third shield 43 in the second direction D2 and a position of the fourth shield 44 in the second direction D2.

The first terminal 41T is electrically connected to the first shield 41. The second terminal 42T is electrically connected to the second shield 42. The third terminal 43T is electrically connected to the third shield 43. The fourth terminal 44T is electrically connected to the fourth shield 44.

The third shield conductive member 43C is connected to the third shield 43. The third shield conductive member 43C includes at least one selected from the group consisting of Cu, Al, Au, and Ag. The third shield conductive member 43C is non-magnetic.

The fourth shield conductive member 44C is connected to the fourth shield 44. The fourth shield conductive member 44C includes at least one selected from the group consisting of Cu, Al, Au, and Ag. The fourth shield conductive member 44C is non-magnetic.

At least one of the third shield conductive member 43C or the fourth shield conductive member 44C functions as a heat sink. As will be described later, a current is supplied to the first magnetic member 11. The temperature of the first magnetic member 11 increases due to the current. The heat of the first magnetic member 11 is efficiently dissipated by the third shield conductive member 43C and the fourth shield conductive member 44C. For example, deterioration of the first magnetic member 11 due to heat can be suppressed. For example, the temperature distribution around the first magnetic member 11 can be uniform. According to the embodiment, it is possible to provide a magnetic head with stable characteristics.

The first shield 41, the second shield 42, the third shield 43, and the fourth shield 44 include a magnetic material. These shields include, for example, at least one selected from the group consisting of Fe, Ni, and Co. These shields include, for example, soft magnetic material. These shields have low thermal 15 conductivity.

For example, the thermal conductivity of the third shield conductive member 43C is higher than the thermal conductivity of the third shield 43. The thermal conductivity of the fourth shield conductive member 44C is higher than the thermal conductivity of the fourth shield 44. Effective heat dissipation can be obtained.

As shown in FIG. 1A, a first circuit 51 and a second circuit 52 may be electrically connected to the reproducing section 70. The first circuit 51 is configured to supply current between the third terminal 43T and the fourth terminal 44T. The second circuit 52 is configured to detect a voltage between the first terminal 41T and the second terminal 42T. The voltage changes depending on the magnetization state of the magnetic recording medium.

This voltage change may be based on, for example, an anomalous Hall effect (AHE). For example, the first magnetic member 11 may have an abnormal Hall effect. For example, the first magnetic member 11 may include at least one selected from the group consisting of CoMnGa, CoMnAl, and FePt. In such materials, it is easy to obtain a large anomalous Hall effect. For example, it is easy to obtain a large reading signal. CoMnGa and CoMnAl are, for example, Heusler alloy materials.

In the embodiment, the volume of the third shield conductive member 43C may be larger than the volume of the third shield 43. For example, the volume of the fourth shield conductive member 44C may be larger than the volume of the fourth shield 44. More efficient heat dissipation can be achieved.

In this example, at least a part of the third shield 43 is provided between the third shield conductive member 43C and the first magnetic member 11 in the second direction D2. At least a part of the fourth shield 44 is provided between the first magnetic member 11 and the fourth shield conductive member 44C in the second direction D2. As will be described later, the arrangement of the shield and the shield conductive member can be modified in various ways.

As shown in FIG. 1A, in this example, the reproducing section 70 includes a first conductive layer 31, a second conductive layer 32, a third conductive layer 33, and a fourth conductive layer 34. The first conductive layer 31 is provided between the first shield 41 and the first magnetic member 11. The second conductive layer 32 is provided between the second shield 42 and the first magnetic member 11. The third conductive layer 33 is provided between the third shield 43 and the first magnetic member 11. The fourth conductive layer 34 is provided between the fourth shield 44 and the first magnetic member 11. At least one of the first conductive layer 31, the second conductive layer 32, the third conductive layer 33, or the fourth conductive layer 34 includes at least one selected from the group consisting of Ta, Ti, W, Cu, Al, and Ru. The shields and the first magnetic member 11 are electrically connected with appropriate electrical resistance. The terminals and the first magnetic member 11 are connected with appropriate electrical resistance.

As shown in FIG. 1A, the reproducing section 70 may further include an insulating member 30i. A part of the insulating member 30i is provided between the first shield 41 and the third shield 43. A part of the insulating member 30i is provided between the first shield 41 and the fourth shield 44. A part of the insulating member 30i is provided between the second shield 42 and the third shield 43. A part of the insulating member 30i is provided between the second shield 42 and the fourth shield 44. The insulating member 30i includes, for example, at least one selected from the group consisting of Si and Al, and at least one selected from the group consisting of oxygen and nitrogen.

In the embodiment, a length of the first magnetic member 11 along the first direction D1 may be, for example, not less than 3 nm and not more than 25 nm. The length of the first magnetic member 11 along the second direction D2 may be, for example, not less than 3 nm and not more than 25 nm. The length of the first magnetic member 11 along a third direction D3 may be, for example, not less than 3 nm and not more than 25 nm. The third direction D3 crosses a plane including the first direction D1 and the second direction D2. The third direction D3 may be, for example, the Z-axis direction.

In one example, when the current density applied to the first magnetic member 11 is $5 \times 10^8$ A/m$^2$, the temperature of the first magnetic member 11 can be lowered by 50° C. or more compared to a reference example in which these shield conductive members are not provided by providing the third shield conductive member 43C and the fourth shield conductive member 44C.

FIG. 2 is a schematic cross-sectional view illustrating a magnetic head according to the first embodiment.

As shown in FIG. 2, in a magnetic head 111 according to the embodiment, the shape of the reproducing section 70 is different from the shape of the reproducing section 70 in the magnetic head 110. The configuration of the magnetic head 111 except for this shape may be the same as the configuration of the magnetic head 110.

In the magnetic head 111, the length of the third shield 43 along the third direction D3 is longer than the length of the first magnetic member 11 along the third direction D3. The length of the fourth shield 44 along the third direction D3 is longer than the length of the first magnetic member 11 along the third direction D3. The length of the third shield conductive member 43C along the third direction D3 is longer than the length of the first magnetic member 11 along the third direction D3. The length of the fourth shield conductive member 44C along the third direction D3 is longer than the length of the first magnetic member 11 along the third direction D3. More efficient heat dissipation can be achieved.

Figure 3:
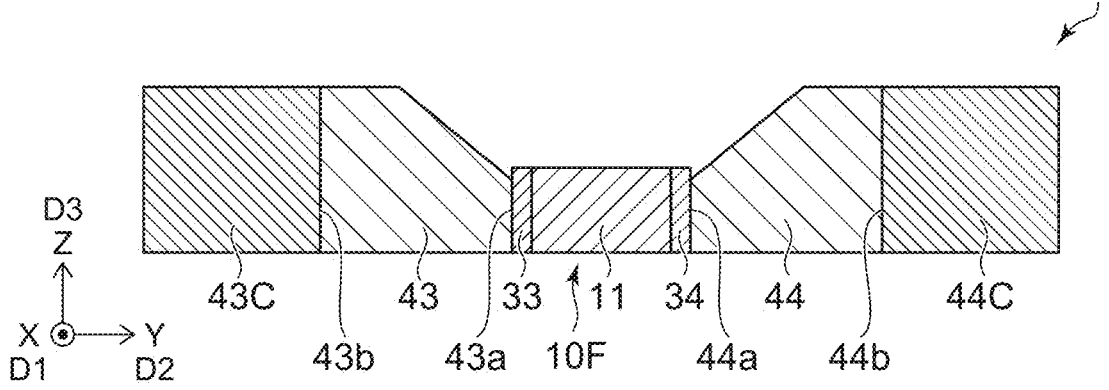
FIG. 3 is a schematic cross-sectional view illustrating a magnetic head according to the first embodiment.

FIG. 3 is a schematic cross-sectional view illustrating a magnetic head according to the first embodiment.

As shown in FIG. 3, in a magnetic head 112 according to the embodiment, the shape of the reproducing section 70 is different from the shape of the reproducing section 70 in the magnetic head 110. The configuration of the magnetic head 112 except for this shape may be the same as the configuration of the magnetic head 110.

In the magnetic head 112, the third shield 43 includes a third opposing face 43*a* and a third opposing other face 43*b*. The third opposing face 43*a* faces the first magnetic member 11. The third opposing other face 43*b* faces the third shield conductive member 43C. A length of the third opposing other face 43*b* along the third direction D3 is longer than a length of the third opposing face 43*a* along the third direction D3. More efficient heat dissipation can be achieved. The length of the third opposing face 43*a* along the third direction D3 may be the same as the length of the first magnetic member 11 along the third direction D3, or may be longer or shorter.

The fourth shield 44 includes a fourth opposing face 44*a* and a fourth opposing other face 44*b*. The fourth opposing face 44*a* faces the first magnetic member 11. The fourth opposing other face 44*b* faces the fourth shield conductive member 44C. A length of the fourth opposing other face 44*b* along the third direction D3 is longer than a length of the fourth opposing face 44*a* along the third direction D3. More efficient heat dissipation can be achieved. The length of the fourth opposing face 44*a* along the third direction D3 may be the same as the length of the first magnetic member 11 along the third direction D3, or may be longer or shorter.

Figure 4:
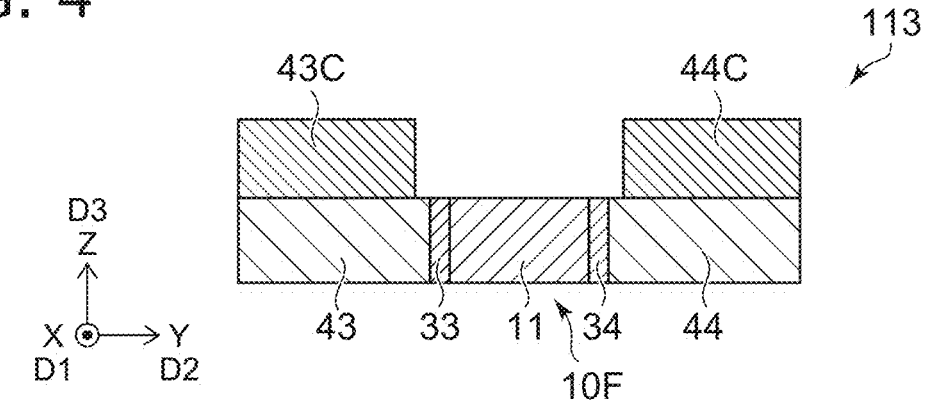
FIG. 4 is a schematic cross-sectional view illustrating a magnetic head according to the first embodiment.

FIG. 4 is a schematic cross-sectional view illustrating a magnetic head according to the first embodiment.

As shown in FIG. 4, in a magnetic head 113 according to the embodiment, the shape of the reproducing section 70 is different from the shape of the reproducing section 70 in the magnetic head 110. The configuration of the magnetic head 113 except for this shape may be the same as the configuration of the magnetic head 110.

In the magnetic head 113, the third direction D3 from the third shield 43 to the third shield conductive member 43C crosses a plane including the first direction D1 and the second direction D2. The third direction D3 from the fourth shield 44 to the fourth shield conductive member 44C crosses a plane including the first direction D1 and the second direction D2.

FIGS. 5A to 5D are schematic cross-sectional views illustrating a magnetic head according to the first embodiment.

A magnetic head 120 according to the embodiment also includes the reproducing section 70. The reproducing section 70 includes the first shield 41, the second shield 42, the third shield 43, the fourth shield 44, the first terminal 41T, the second terminal 42T, the third terminal 43T, the fourth terminal 44T, and the first shield conductive member 41C. The configuration of the magnetic head 120 may be the same as the configuration of the magnetic head 110 except for the first shield conductive member 41C.

Figure 5A:
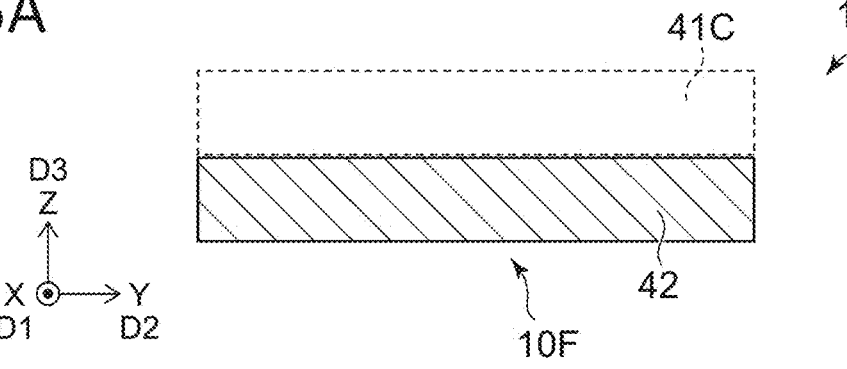
FIGS. 5A to 5D are schematic cross-sectional views illustrating a magnetic head according to the first embodiment.
Figure 5B:
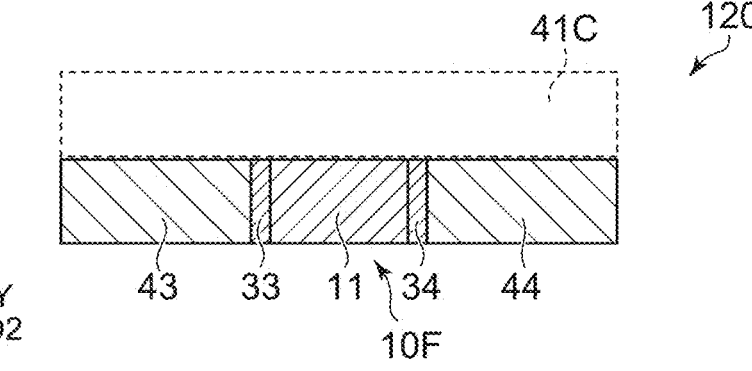
Figure 5C:
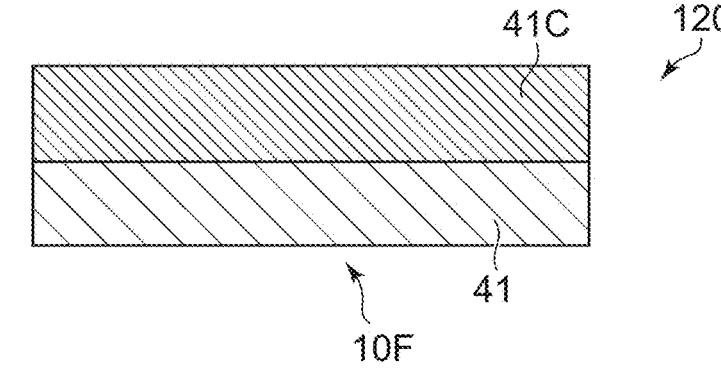
Figure 5D:
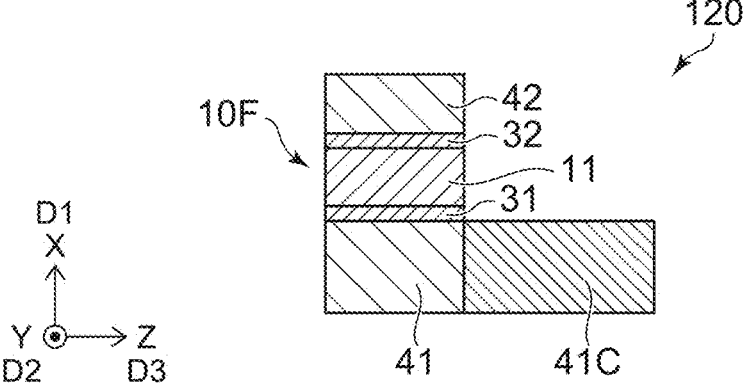

FIG. 5A is a cross-sectional view on a plane including the second shield 42. FIG. 5B is a cross-sectional view on a plane including the first magnetic member 11. FIG. 5C is a cross-sectional view on a plane including the first shield 41. FIG. 5D is a sectional view corresponding to the X1-X2 line in FIG. 1A.

The first shield conductive member 41C is connected to the first shield 41. The third direction D3 from at least a part of the first shield 41 to the first shield conductive member 41C crosses a plane including the first direction D1 and the second direction D2. The first shield conductive member 41C includes at least one selected from the group consisting of Cu, Al, Au, and Ag.

The first shield conductive member 41C functions, for example, as a heat sink. Efficient heat dissipation can be obtained. A magnetic head that can obtain stable characteristics can be provided.

In the embodiment, the first shield 41 and the second shield 42 are interchangeable. The first shield conductive member 41C described regarding the magnetic head 120 may be connected to the second shield 42.

Figure 6:
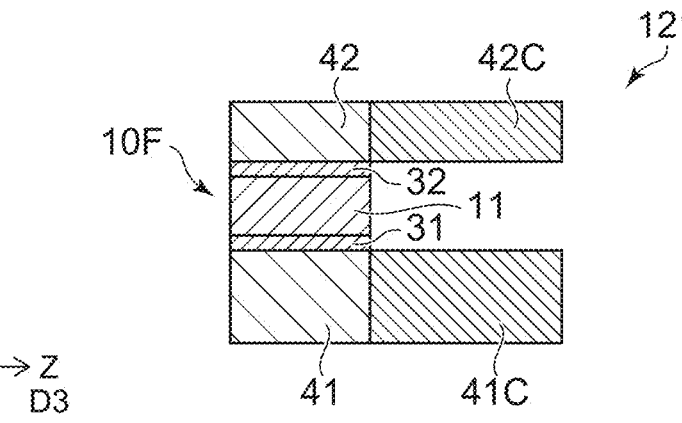
FIG. 6 is a schematic cross-sectional view illustrating a magnetic head according to the first embodiment.

FIG. 6 is a schematic cross-sectional view illustrating a magnetic head according to the first embodiment.

As shown in FIG. 6, in a magnetic head 121 according to the embodiment, the reproducing section 70 further includes a second shield conductive member 42C. The configuration of the magnetic head 121 except for this may be the same as the configuration of the magnetic head 120. FIG. 6 is a cross-sectional view taken along the line X1-X2 in FIG. 1A.

The second shield conductive member 42C is connected to the second shield 42. A direction from at least a part of the second shield 42 to the second shield conductive member 42C is along the third direction D3. The second shield conductive member 42C includes at least one selected from the group consisting of Cu, Al, Au, and Ag. The second shield conductive member 42C functions, for example, as a heat sink. Efficient heat dissipation can be obtained.

Figure 7A:
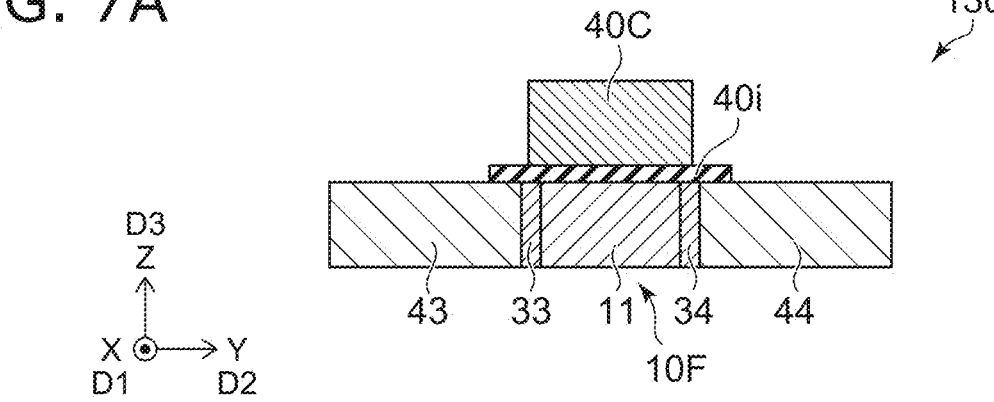
FIGS. 7A and 7B are schematic cross-sectional views illustrating a magnetic head according to the first embodiment.
Figure 7B:
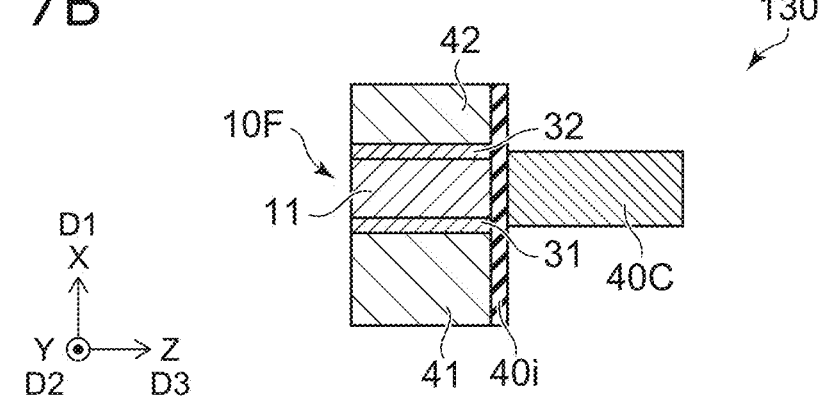

FIGS. 7A and 7B are schematic cross-sectional views illustrating a magnetic head according to the first embodiment.

A magnetic head 130 according to the embodiment also includes the reproducing section 70. The reproducing section 70 includes the first shield 41, the second shield 42, the third shield 43, the fourth shield 44, the first terminal 41T, the second terminal 42T, the third terminal 43T, the fourth terminal 44T, a first conductive member 40C, and a first insulating layer 40*i*. The configuration of the magnetic head 130 may be the same as the configuration of the magnetic head 110 except for the first conductive member 40C and the first insulating layer 40*i*.

The first conductive member 40C includes at least one member selected from the group consisting of Cu, Al, Au, and Ag. At least a part of the first insulating layer 40*i* is provided between the first conductive member 40C and the first magnetic member 11. The heat of the first magnetic member 11 is transmitted to the first conductive member 40C via the first insulating layer 40*i*. The first conductive member 40C functions, for example, as a heat sink. Efficient heat dissipation can be obtained.

In this example, the third direction D3 from the first magnetic member 11 to the first conductive member 40C crosses a plane including the first direction D1 and the second direction D2. A thickness of the first insulating layer 40*i* along the third direction D3 may be, for example, not less than 1 nm and not more than 20 nm. It is easy to obtain good insulation and good heat conduction.

The first insulating layer 40*i* includes, for example, at least one selected from the group consisting of Si and Al, and at least one selected from the group consisting of oxygen and nitrogen.

Figure 8:
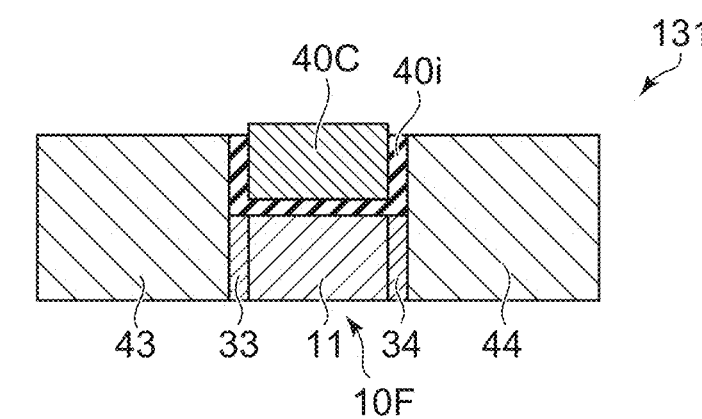
FIG. 8 is a schematic cross-sectional view illustrating a magnetic head according to the first embodiment.

FIG. 8 is a schematic cross-sectional view illustrating a magnetic head according to the first embodiment.

In a magnetic head 131 according to the embodiment, the shape of the reproducing section 70 is different from the shape of the reproducing section 70 in the magnetic head 130. The configuration of the magnetic head 131 except for this shape may be the same as the configuration of the magnetic head 130.

In the magnetic head 131, at least a part of the first conductive member 40C is provided between the third shield 43 and the fourth shield 44 in the second direction D2. A part of the first insulating layer 40*i* is provided between the first conductive member 40C and the third shield 43 and between the first conductive member 40C and the fourth shield 44. Efficient heat dissipation can be obtained.

Figure 9:
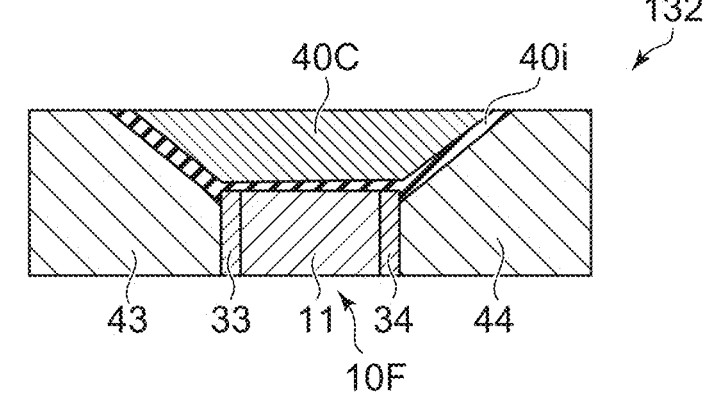
FIG. 9 is a schematic cross-sectional view illustrating a magnetic head according to the first embodiment.

FIG. 9 is a schematic cross-sectional view illustrating a magnetic head according to the first embodiment.

In a magnetic head 132 according to the embodiment, the shape of the reproducing section 70 is different from the shape of the reproducing section 70 in the magnetic head 131. The configuration of the magnetic head 132 except for this shape may be the same as the configuration of the magnetic head 131.

In the magnetic head 132, a face of the first conductive member 40C that faces the third shield 43 is inclined with respect to the third direction D3. A face of the first conductive member 40C that faces the fourth shield 44 is inclined with respect to the third direction D3. Efficient heat radiation can also be obtained in the magnetic head 132.

Figure 10:
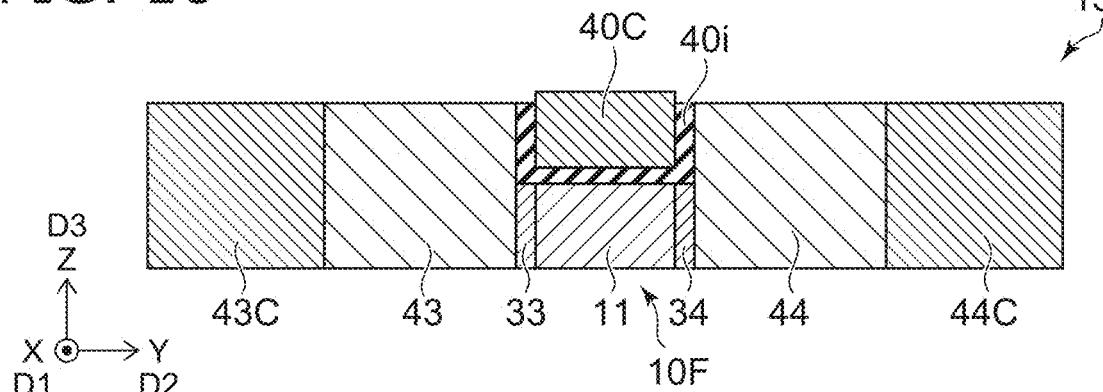
FIG. 10 is a schematic cross-sectional view illustrating a magnetic head according to the first embodiment.

FIG. 10 is a schematic cross-sectional view illustrating a magnetic head according to the first embodiment.

In a magnetic head 133 according to the embodiment, the reproducing section 70 includes the third shield conductive member 43C and the fourth shield conductive member 44C. The configuration of the magnetic head 133 except for this may be the same as the configuration of the magnetic head 131.

The third shield conductive member 43C is connected to the third shield 43. The fourth shield conductive member 44C is connected to the fourth shield 44. The third shield conductive member 43C and the fourth shield conductive member 44C include at least one selected from the group consisting of Cu, Al, Au, and Ag. By providing the third shield conductive member 43C and the fourth shield conductive member 44C in addition to the first conductive member 40C, higher heat dissipation can be obtained.

In this example, at least a part of the third shield 43 is provided between the third shield conductive member 43C and the first magnetic member 11 in the second direction D2. At least a part of the fourth shield 44 is provided between the first magnetic member 11 and the fourth shield conductive member 44C in the second direction D2.

Figure 11:
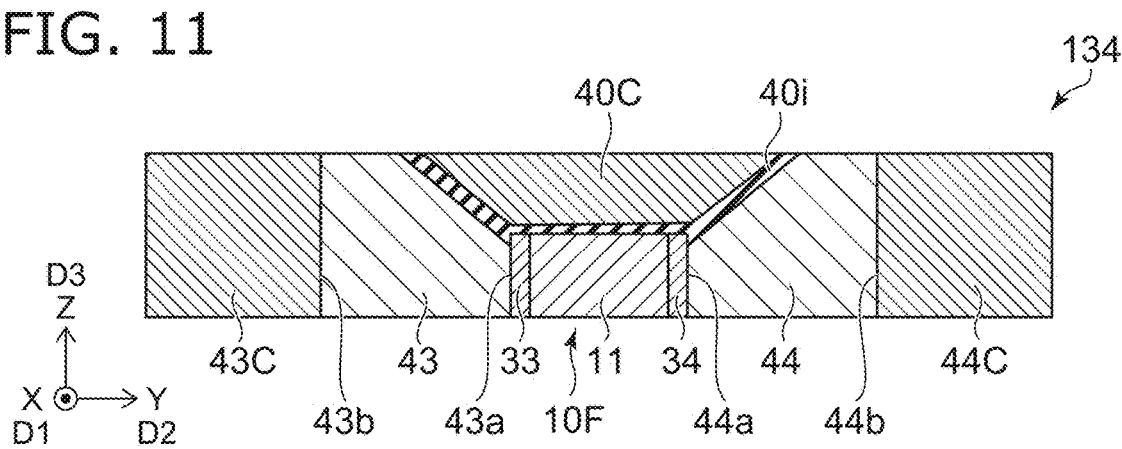
FIG. 11 is a schematic cross-sectional view illustrating a magnetic head according to the first embodiment.

FIG. 11 is a schematic cross-sectional view illustrating a magnetic head according to the first embodiment.

In a magnetic head 134 according to the embodiment, the shape of the reproducing section 70 is different from the shape of the reproducing section 70 in the magnetic head 133. The configuration of the magnetic head 133 except for this shape may be the same as the configuration of the magnetic head 131.

In the magnetic head 134, the third shield 43 includes the third opposing face 43*a* and the third opposing other face 43*b*. The third opposing face 43*a* faces the first magnetic member 11. The third opposing other face 43*b* faces the third shield conductive member 43C. The length of the third opposing other face 43*b* along the third direction D3 is longer than the length of the third opposing face 43*a* along the third direction D3. More efficient heat dissipation can be achieved.

In the magnetic head 134, the fourth shield 44 includes the fourth opposing face 44*a* and the fourth opposing other face 44*b*. The fourth opposing face 44*a* faces the first magnetic member 11. The fourth opposing other face 44*b* faces the fourth shield conductive member 44C. The length of the fourth opposing other face 44*b* along the third direction D3 is longer than the length of the fourth opposing face 44*a* along the third direction D3. More efficient heat dissipation can be achieved.

Figure 12:
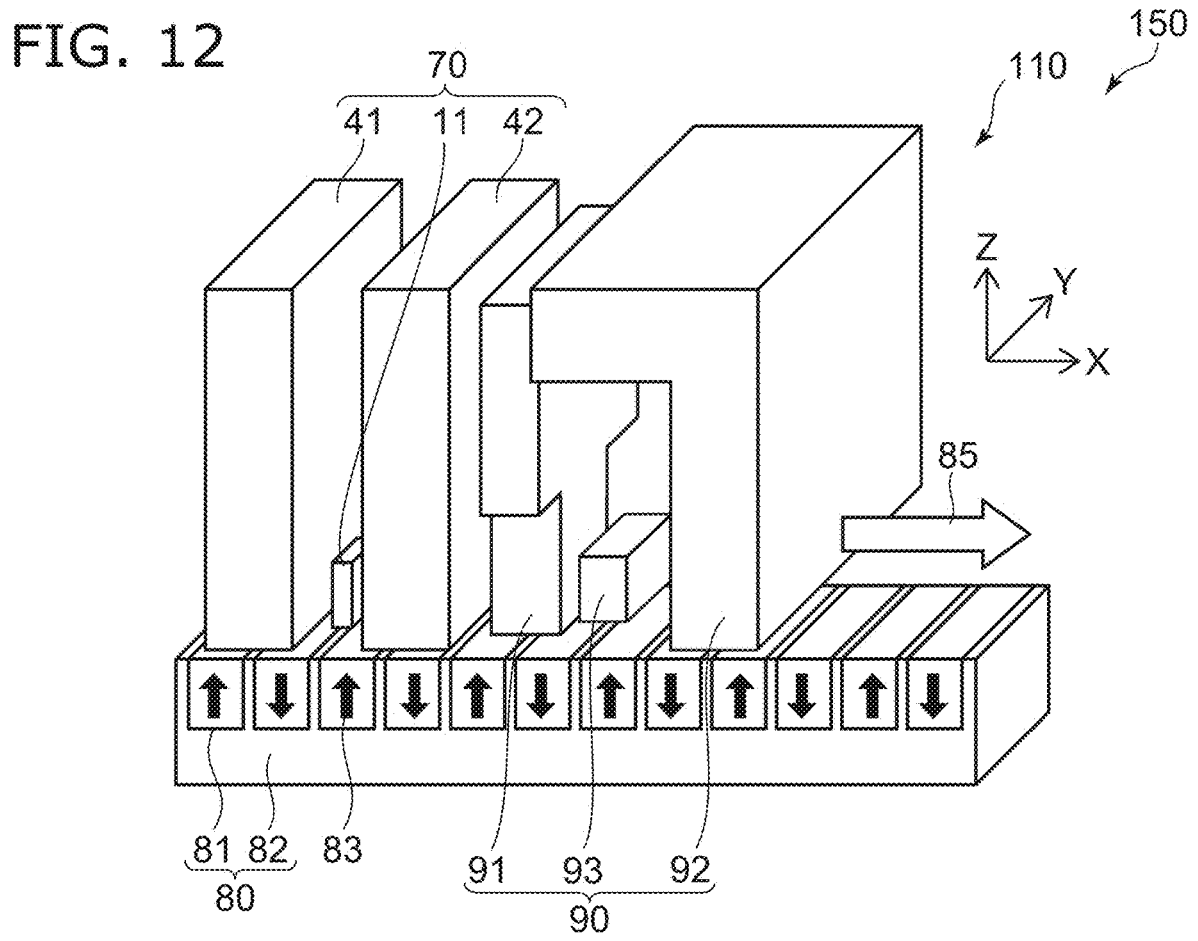
FIG. 12 is a schematic perspective view illustrating the magnetic head and a magnetic recording device according to the first embodiment.

FIG. 12 is a schematic perspective view illustrating the magnetic head and magnetic recording device according to the first embodiment.

As shown in FIG. 12, a magnetic head 110 is depicted as the magnetic head according to the first embodiment. A magnetic recording device 150 according to the embodiment includes the magnetic head 110 and a magnetic recording medium 80.

As shown in FIG. 12, the magnetic head 110 according to the embodiment may further include a recording section 90. Information is recorded on the magnetic recording medium 80 by the recording section 90 of the magnetic head 110. The reproducing section 70 reproduces information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording section 90. The recording section 90 includes, for example, a first magnetic pole 91 and a second magnetic pole 92. The first magnetic pole 91 is, for example, a main magnetic pole. The second magnetic pole 92 is, for example, a trailing shield. The recording section 90 may include a recording section element 93. The recording section element 93 may include a magnetic field control element, a heating element, a high frequency oscillation element, or the like. The recording section element 93 may be omitted.

The reproducing section 70 includes, for example, the first shield 41, the second shield 42, and the first magnetic member 11. The first magnetic member 11 can output a signal according to the magnetization 83 of the magnetic recording layer 81. In FIG. 12, the third shield 43 and fourth shield 44 are omitted. In FIG. 12, the above-mentioned shield conductive member is omitted.

As shown in FIG. 12, the magnetic recording medium 80 moves relative to the magnetic head 110 in a medium movement direction 85. The magnetic head 110 controls information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 13:
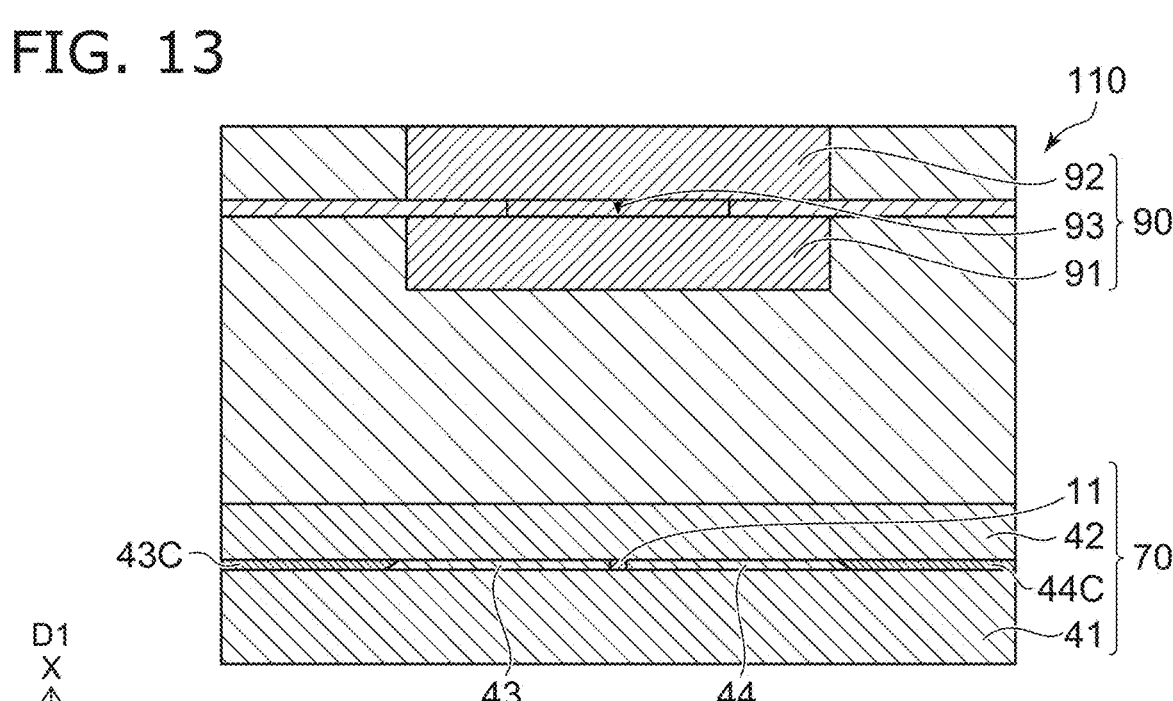
FIG. 13 is a schematic plan view illustrating the magnetic head and the magnetic recording device according to the first embodiment.

FIG. 13 is a schematic plan view illustrating the magnetic head and magnetic recording device according to the first embodiment.

The magnetic head 110 may further include the recording section 90 including the first magnetic pole 91. The recording section 90 includes the first magnetic pole 91. For example, the third shield 43 overlaps a part of the first magnetic pole 91 in the first direction D1. At least a part of the third shield conductive member 43C does not overlap the first magnetic pole 91 in the first direction D1. For example, the fourth shield 44 overlaps another part of the first magnetic pole 91 in the first direction D1.

At least a part of the fourth shield conductive member 44C does not overlap with the first magnetic pole 91 in the first direction D1. The first magnetic member 11 may overlap the recording section element 93 in the first direction D1.

Second Embodiment

The second embodiment relates to the magnetic recording device 150. The magnetic recording device 150 includes the magnetic head (for example, the magnetic head 110) according to the first embodiment and the magnetic recording medium 80 (see FIG. 12). The magnetic recording device 150 includes the first circuit 51 and the second circuit 52 described with respect to FIG. 1A. The magnetic recording medium 80 faces the magnetic head 110. The first circuit 51 is configured to supply current between the third terminal 43T and the fourth terminal 44T. The second circuit 52 is configured to detect the voltage between the first terminal 41T and the second terminal 42T. The voltage changes depending on the magnetization state recorded on the magnetic recording medium 80.

Figure 14:
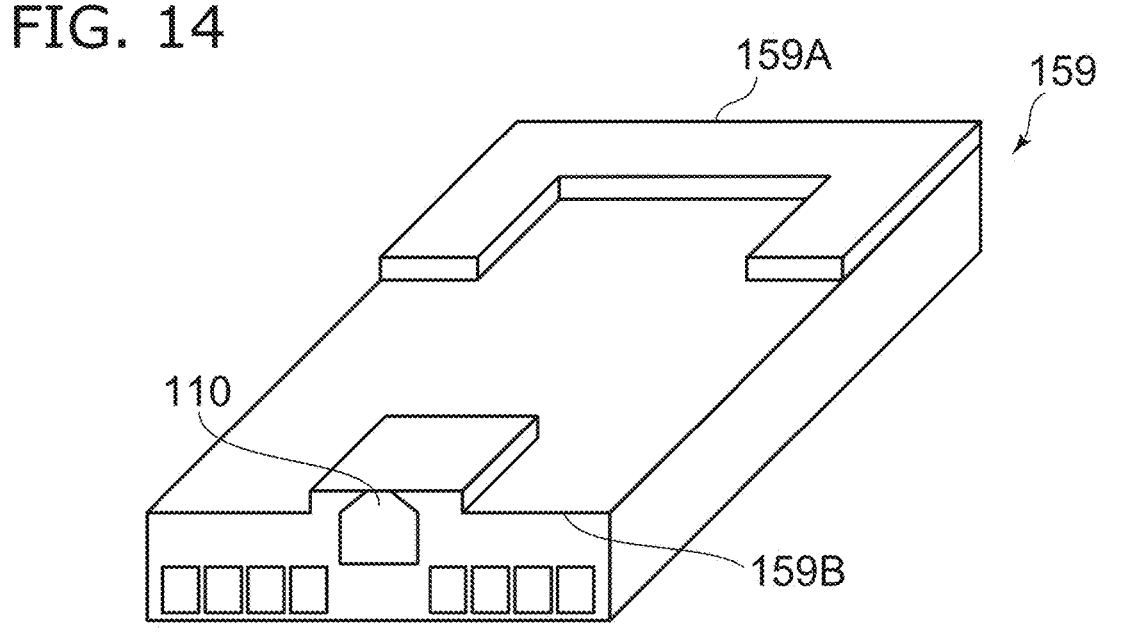
FIG. 14 is a schematic perspective view illustrating a part of the magnetic recording device according to the embodiment.

FIG. 14 is a schematic perspective view illustrating a part of the magnetic recording device according to the embodiment.

FIG. 14 illustrates a head slider.

The magnetic head 110 is provided on a head slider 159. The head slider 159 includes, for example, Al2O3/TIC. The head slider 159 moves relative to the magnetic recording medium while flying over or in contact with the magnetic recording medium.

The head slider 159 has, for example, an air inflow side 159A and an air outflow side 159B. The magnetic head 110 is arranged on the side surface of the air outflow side 159B of the head slider 159. As a result, the magnetic head 110 moves relative to the magnetic recording medium while floating above or in contact with the magnetic recording medium.

Figure 15:
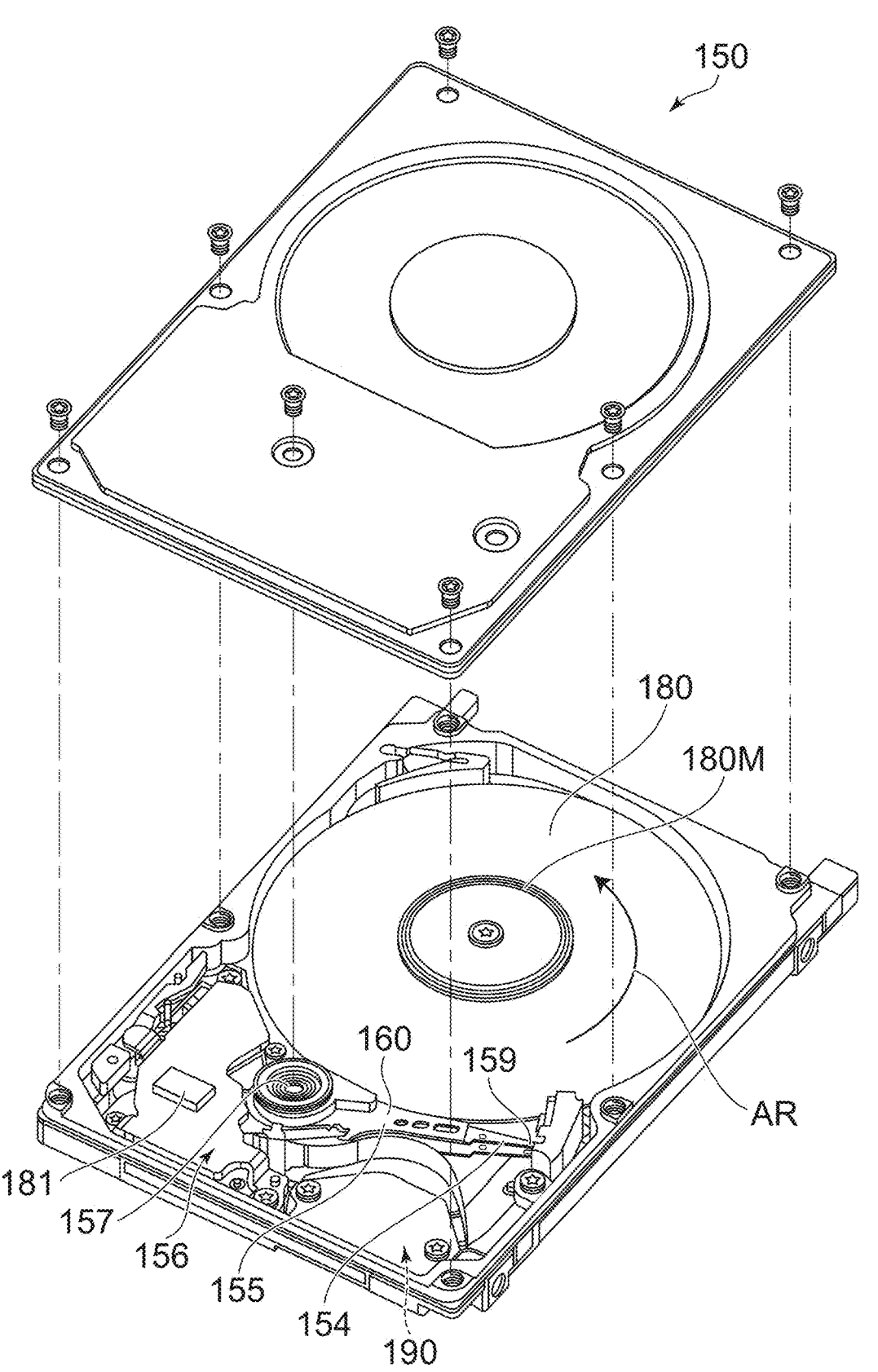
FIG. 15 is a schematic perspective view illustrating the magnetic recording device according to the embodiment.

FIG. 15 is a schematic perspective view illustrating the magnetic recording device according to the embodiment.

Figures 16A, 16B:
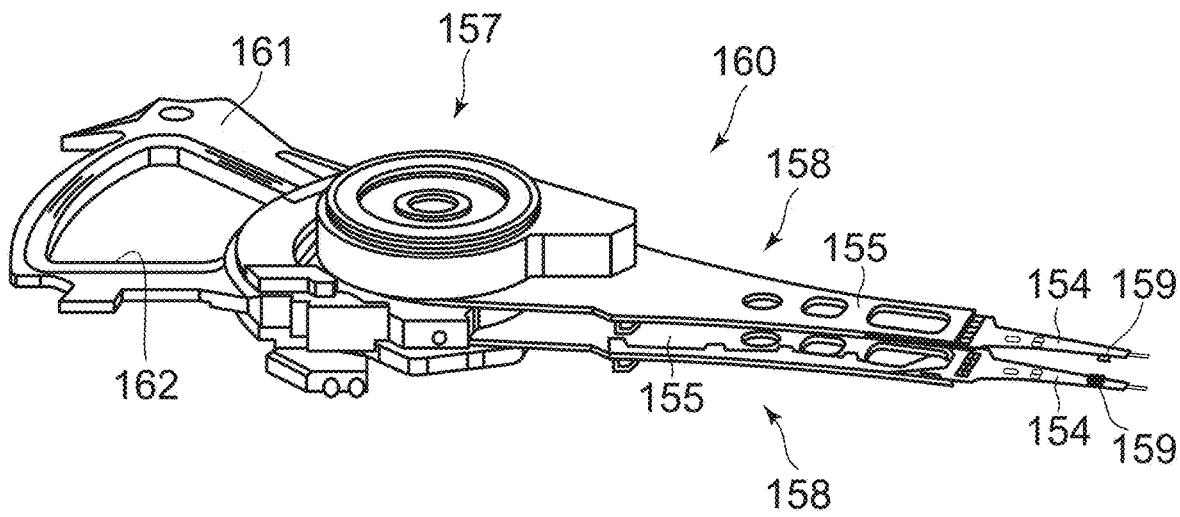
FIGS. 16A and 16B are schematic perspective views illustrating a part of the magnetic recording device according to the embodiment.

FIGS. 16A and 16B are schematic perspective views illustrating a part of the magnetic recording device according to the embodiment.

As shown in FIG. 15, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension

154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 16A is an enlarged perspective view of the head stack assembly 160, illustrating the configuration of a part of the magnetic recording device.

FIG. 16B is a perspective view illustrating the magnetic head assembly (head gimbal assembly: HGA) 158 that forms part of the head stack assembly 160.

As shown in FIG. 16A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 16B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following Technical proposals:

Technical Proposal 1

A magnetic head, comprising:
a reproducing section,
the reproducing section including:
a first shield;
a second shield, a direction from the first shield to the second shield being along a first direction;
a third shield;
a fourth shield, a second direction from the third shield to the fourth shield crossing the first direction;
a first magnetic member provided between the first shield and the second shield and between the third shield and the fourth shield;
a first terminal electrically connected to the first shield;
a second terminal electrically connected to the second shield;
a third terminal electrically connected to the third shield;
a fourth terminal electrically connected to the fourth shield; and
a third shield conductive member connected to the third shield and including at least one selected from the group consisting of Cu, Al, Au, and Ag.

Technical Proposal 2

The magnetic head according to Technical proposal 1, wherein
a volume of the third shield conductive member is larger than a volume of the third shield.

Technical Proposal 3

The magnetic head according to Technical proposal 1 or 2, wherein
the reproducing section further includes a fourth shield conductive member, and
the fourth shield conductive member is connected to the fourth shield and includes at least one selected from the group consisting of Cu, Al, Au, and Ag.

Technical Proposal 4

The magnetic head according to Technical proposal 3, wherein a volume of the fourth shield conductive member is larger than a volume of the fourth shield.

Technical Proposal 5

The magnetic head according to Technical proposal 3 or 4, wherein
at least a part of the fourth shield is provided between the first magnetic member and the fourth shield conductive member in the second direction.

Technical Proposal 6

The magnetic head according to any one of Technical proposals 3-5, wherein
the fourth shield includes a fourth opposing face and a fourth opposing other face,
the fourth opposing face faces the first magnetic member, the fourth opposing other face faces the fourth shield conductive member,
a length of the fourth opposing other face along a third direction is longer than a length of the fourth opposing face along the third direction, and
the third direction crosses a plane including the first direction and the second direction.

Technical Proposal 7

The magnetic head according to any one of Technical proposals 1-5, wherein
the third shield includes a third opposing face and a third opposing other face,
the third opposing face faces the first magnetic member, the third opposing other face faces the third shield conductive member,
a length of the third opposing other face along the third direction is longer than a length of the third opposing face along the third direction, and
the third direction crosses a plane including the first direction and the second direction.

Technical Proposal 8

The magnetic head according to any one of Technical proposals 1-5, wherein
at least a part of the third shield is provided between the third shield conductive member and the first magnetic member in the second direction.

Technical Proposal 9

The magnetic head according to any one of Technical proposals 1-5, wherein
a third direction from the third shield to the third shield conductive member crosses a plane including the first direction and the second direction.

Technical Proposal 10

The magnetic head according to any one of Technical proposals 3-5, wherein
a third direction from the fourth shield to the fourth shield conductive member crosses a plane including the first direction and the second direction.

Technical Proposal 11

The magnetic head according to any one of Technical proposals 1-10, wherein

13 the third shield and the fourth shield are provided between the first shield and the second shield.

Technical Proposal 12

A magnetic head, comprising:
a reproducing section,
the reproducing section including:
a first shield;
a second shield, a direction from the first shield to the second shield being along a first direction;
a third shield;
a fourth shield, a second direction from the third shield to the fourth shield crossing the first direction;
a first magnetic member provided between the first shield and the second shield and between the third shield and the fourth shield;
a first terminal electrically connected to the first shield;
a second terminal electrically connected to the second shield;
a third terminal electrically connected to the third shield;
a fourth terminal electrically connected to the fourth shield; and
a first shield conductive member connected to the first shield, a third direction from at least a part of the first shield to the first shield conductive member crossing a plane including the first direction and the second direction, the first shield conductive member including at least one selected from the group consisting of Cu, Al, Au, and Ag.

Technical Proposal 13

The magnetic head according to Technical proposal 12, wherein
the reproducing section further includes a second shield conductive member,
the second shield conductive member is connected to the second shield,
a direction from at least a part of the second shield to the second shield conductive member is along the third direction, and the second shield conductive member includes at least one selected from the group consisting of Cu, Al, Au, and Ag.

Technical Proposal 14

A magnetic head, comprising:
a reproducing section,
the reproducing section including:
a first shield;
a second shield, a direction from the first shield to the second shield being along a first direction;
a third shield;
a fourth shield, a second direction from the third shield to the fourth shield crossing the first direction;
a first magnetic member provided between the first shield and the second shield and between the third shield and the fourth shield;
a first terminal electrically connected to the first shield;
a second terminal electrically connected to the second shield;
a third terminal electrically connected to the third shield;
a fourth terminal electrically connected to the fourth shield;
a first conductive member including at least one selected from the group consisting of Cu, Al, Au, and Ag; and

a first insulating layer, at least a part of the first insulating layer being provided between the first conductive member and the first magnetic member.

Technical Proposal 15

The magnetic head according to Technical proposal 14, wherein
a third direction from the first magnetic member to the first conductive member crosses a plane including the first direction and the second direction.

Technical Proposal 16

The magnetic head according to Technical proposal 14 or 15, wherein
at least a part of the first conductive member is provided between the third shield and the fourth shield in the second direction, and
a part of the first insulating layer is provided between the first conductive member and the third shield and between the first conductive member and the fourth shield.

Technical Proposal 17

The magnetic head according to any one of Technical proposals 14-16, wherein
the reproducing section further includes a third shield conductive member and a fourth shield conductive member,
the third shield conductive member is connected to the third shield,
the fourth shield conductive member is connected to the fourth shield, and
the third shield conductive member and the fourth shield conductive member include at least one selected from the group consisting of Cu, Al, Au, and Ag.

Technical Proposal 18

The magnetic head according to Technical proposal 17, wherein
at least a part of the third shield is provided between the third shield conductive member and the first magnetic member in the second direction, and
at least a part of the fourth shield is provided between the first magnetic member and the fourth shield conductive member in the second direction.

Technical Proposal 19

The magnetic head according to any one of Technical proposals 1-11, further comprising:
a recording section including a first magnetic pole, the third shield overlapping a part of the first magnetic pole in the first direction, and
at least a part of the third shield conductive member not overlapping the first magnetic pole in the first direction.

Technical Proposal 20

A magnetic recording device, comprising:
the magnetic head according to any one of Technical proposals 1 to 19,
a magnetic recording medium facing the magnetic head;
a first circuit; and a second circuit, the first circuit being configured to supply current between the third terminal and the fourth terminal, and the second circuit being configured to detect a voltage between the first terminal and the second terminal.

According to the embodiment, a magnetic head and a magnetic recording device that can obtain stable characteristics can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as shields, magnetic members, conductive members, insulating layers, insulating members, terminals, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and all magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:

a reproducing section, the reproducing section including:

a first shield;

a second shield, a direction from the first shield to the second shield being along a first direction;

a third shield;

a fourth shield, a second direction from the third shield to the fourth shield crossing the first direction;

a first magnetic member provided between the first shield and the second shield and between the third shield and the fourth shield;

a first terminal electrically connected to the first shield;

a second terminal electrically connected to the second shield;

a third terminal electrically connected to the third shield;

a fourth terminal electrically connected to the fourth shield; and a third shield conductive member connected to the third shield and including at least one selected from the group consisting of Cu, Al, Au, and Ag, wherein at least a part of the first terminal, at least a part of the second terminal, at least a part of the third terminal, and at least a part of the fourth terminal are positioned outside of between the first shield and the second shield.

2. The magnetic head according to claim 1, wherein a volume of the third shield conductive member is larger than a volume of the third shield.

3. The magnetic head according to claim 1, wherein the reproducing section further includes a fourth shield conductive member, and the fourth shield conductive member is connected to the fourth shield and includes at least one selected from the group consisting of Cu, Al, Au, and Ag.

4. The magnetic head according to claim 3, wherein a volume of the fourth shield conductive member is larger than a volume of the fourth shield.

5. A magnetic head, comprising:

a reproducing section, the reproducing section including:

a first shield;

a second shield, a direction from the first shield to the second shield being along a first direction;

a third shield;

a fourth shield, a second direction from the third shield to the fourth shield crossing the first direction;

a first magnetic member provided between the first shield and the second shield and between the third shield and the fourth shield;

a first terminal electrically connected to the first shield;

a second terminal electrically connected to the second shield;

a third terminal electrically connected to the third shield;

a fourth terminal electrically connected to the fourth shield; and a third shield conductive member connected to the third shield and including at least one selected from the group consisting of Cu, Al, Au, and Ag wherein the reproducing section further includes a fourth shield conductive member, the fourth shield conductive member is connected to the fourth shield and includes at least one selected from the group consisting of Cu, Al, Au, and Ag, and at least a part of the fourth shield is provided between the first magnetic member and the fourth shield conductive member in the second direction.

6. The magnetic head according to claim 3, wherein the fourth shield includes a fourth opposing face and a fourth opposing other face, the fourth opposing face faces the first magnetic member, the fourth opposing other face faces the fourth shield conductive member, a length of the fourth opposing other face along a third direction is longer than a length of the fourth opposing face along the third direction, and the third direction crosses a plane including the first direction and the second direction.

7. The magnetic head according to claim 1, wherein the third shield includes a third opposing face and a third opposing other face, the third opposing face faces the first magnetic member, the third opposing other face faces the third shield con-
ductive member, a length of the third opposing other face along the third
direction is longer than a length of the third opposing
face along the third direction, and the third direction crosses a plane including the first
direction and the second direction.

8. The magnetic head according to claim 1, wherein at least a part of the third shield is provided between the
third shield conductive member and the first magnetic
member in the second direction.

9. The magnetic head according to claim 1, wherein a third direction from the third shield to the third shield
conductive member crosses a plane including the first
direction and the second direction.

10. The magnetic head according to claim 3, wherein a third direction from the fourth shield to the fourth shield
conductive member crosses a plane including the first
direction and the second direction.

11. The magnetic head according to claim 1, wherein the third shield and the fourth shield are provided between
the first shield and the second shield.

12. A magnetic head, comprising:

a reproducing section, the reproducing section including:

a first shield;

a second shield, a direction from the first shield to the
second shield being along a first direction;

a third shield;

a fourth shield, a second direction from the third shield to
the fourth shield crossing the first direction;

a first magnetic member provided between the first shield
and the second shield and between the third shield and
the fourth shield;

a first terminal electrically connected to the first shield;

a second terminal electrically connected to the second
shield;

a third terminal electrically connected to the third shield;

a fourth terminal electrically connected to the fourth
shield; and a first shield conductive member connected to the first
shield, a third direction from at least a part of the first
shield to the first shield conductive member crossing a
plane including the first direction and the second direc-
tion, the first shield conductive member including at
least one selected from the group consisting of Cu, Al,
Au, and Ag, wherein at least a part of the first terminal,
at least a part of the second terminal, at least a part of
the third terminal, and at least a part of the first terminal
are positioned outside of between the first shield and
the second shield.

13. The magnetic head according to claim 12, wherein the reproducing section further includes a second shield
conductive member, the second shield conductive member is connected to the
second shield, a direction from at least a part of the second shield to the
second shield conductive member is along the third
direction, and the second shield conductive member includes at least one
selected from the group consisting of Cu, Al, Au, and
Ag.

14. A magnetic head, comprising:

a reproducing section, the reproducing section including:

a first shield;

a second shield, a direction from the first shield to the
second shield being along a first direction;

a third shield;

a fourth shield, a second direction from the third shield to
the fourth shield crossing the first direction;

a first magnetic member provided between the first shield
and the second shield and between the third shield and
the fourth shield;

a first terminal electrically connected to the first shield;

a second terminal electrically connected to the second
shield;

a third terminal electrically connected to the third shield;

a fourth terminal electrically connected to the fourth
shield;

a first conductive member including at least one selected
from the group consisting of Cu, Al, Au, and Ag; and a first insulating layer, at least a part of the first insulating
layer being provided between the first conductive mem-
ber and the first magnetic member, wherein a third
direction from the first magnetic member to the first
conductive member crosses a plane including the first
direction and the second direction.

15. The magnetic head according to claim 14, wherein at least a part of the first conductive member is provided
between the third shield and the fourth shield in the
second direction, and a part of the first insulating layer is provided between the
first conductive member and the third shield and
between the first conductive member and the fourth
shield.

16. The magnetic head according to claim 14, wherein the reproducing section further includes a third shield
conductive member and a fourth shield conductive
member, the third shield conductive member is connected to the
third shield, the fourth shield conductive member is connected to the
fourth shield, and the third shield conductive member and the fourth shield
conductive member include at least one selected from
the group consisting of Cu, Al, Au, and Ag.

17. The magnetic head according to claim 16, wherein at least a part of the third shield is provided between the
third shield conductive member and the first magnetic
member in the second direction, and at least a part of the fourth shield is provided between the
first magnetic member and the fourth shield conductive
member in the second direction.

18. The magnetic head according to claim 1, further
comprising:

a recording section including a first magnetic pole, the third shield overlapping a part of the first magnetic
pole in the first direction, and at least a part of the third shield conductive member not
overlapping the first magnetic pole in the first direction.

19. A magnetic recording device, comprising:

the magnetic head according to claim 1, a magnetic recording medium facing the magnetic head;

a first circuit; and a second circuit, the first circuit being configured to supply current
between the third terminal and the fourth terminal, and the second circuit being configured to detect a voltage
between the first terminal and the second terminal.

* * * * *